United States Patent Office 3,077,144
Patented Feb. 12, 1963

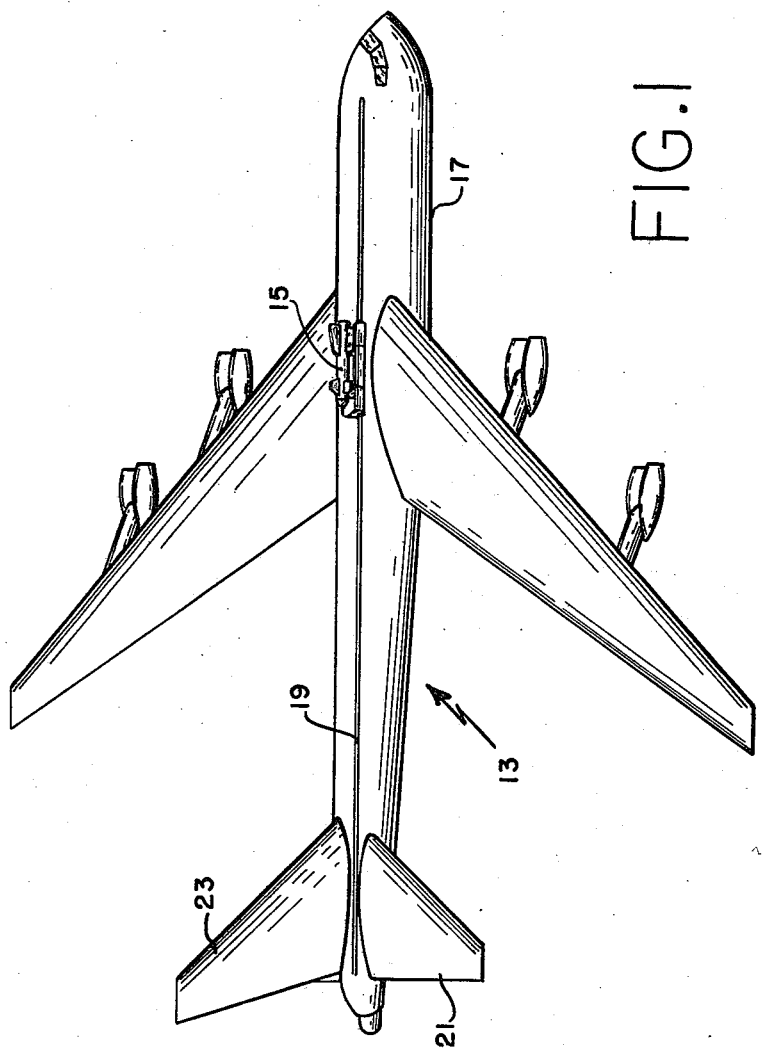

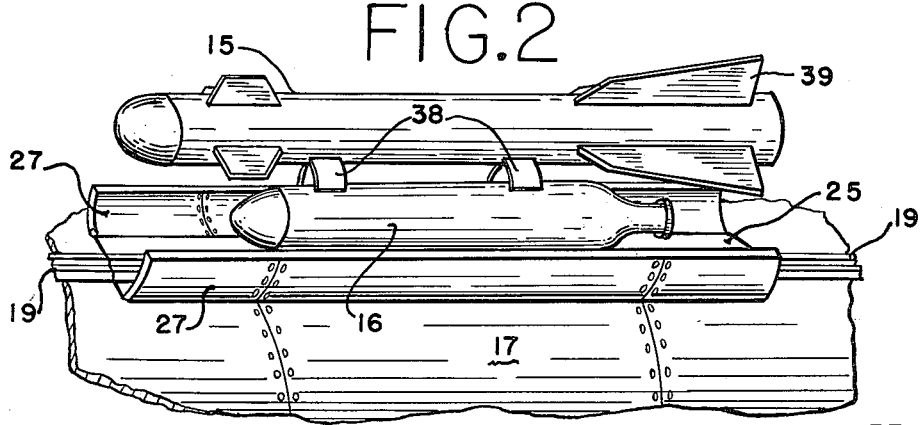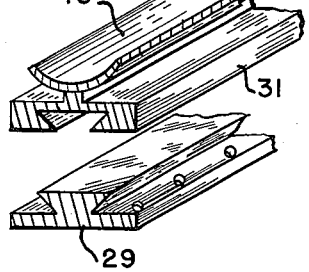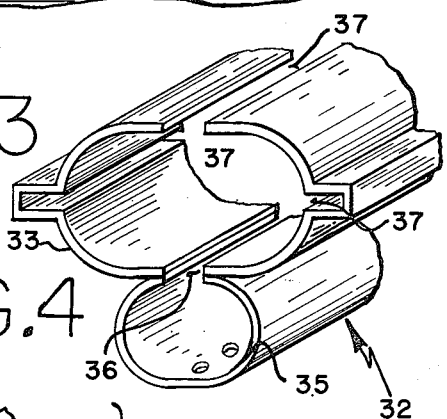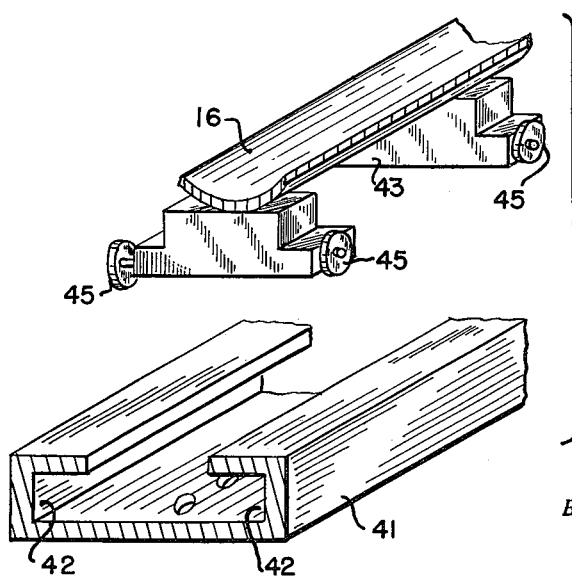

3,077,144
AIRCRAFT ROCKET LAUNCHER
Charles L. Barker, Jr., Huntsville, Ala., and Werner K. Kern, Tallahassee, Fla., assignors to the United States of America as represented by the Secretary of the Air Force
Filed June 17, 1960, Ser. No. 37,008
3 Claims. (Cl. 89—1.7)
(Granted under Title 35, U.S. Code (1952), sec. 266)

The invention described herein may be manufactured and used by or for the United States Government for government purposes without payment to us of any royalty thereon.

This invention relates to apparatus for launching rockets or other self-propelled missiles from moving aircraft and is more particularly concerned with providing a technique for launching rocket rearwardly from fast moving airborne aircraft.

Many missile launching techniques have been devised in an effort to increase the fire power of presently known high flying and fast moving aircraft. Both offensive and defensive considerations are important in the design and utilization of armament systems on these aircraft. As a result of recent developments, particularly with respect to increased speed and altitude ceilings, the use of rockets and self-propelled missiles is essential for complete offensive and defensive coverage. The launching of rockets from aircraft in the forward direction, that is, in the same direction that the aircraft is flying, is relatively easily accomplished. The airstream passing over the rocket allows normal control means to guide the rocket away from the launching aircraft and toward the target.

However, when it is desirable or necessary to launch the rocket in a rearward direction from a fast flying aircraft, there exists the problem of providing adequate control of the rocket during its initial movement because of the presence of a negative relative velocity with respect to the aircraft airstream. Present solutions of this problem of rearward delivery of rocket powered offensive and defensive munitions consist of complicated control systems which utilize jet vanes, pop-out fins, and other mechanically or electrically operated means. These types of complicated control systems are subject to frequent component failure resulting in malfunction and consequent misfiring of the rocket.

Accordingly, it is an object of the present invention to provide a simple and economical means for launching a conventional self-powered missile or rocket in the rearward direction from a rapidly flying aircraft.

Another object of the invention is to provide means for restraining the directional movement of a rearwardly launched rocket until the relative velocity of the missile is positive with respect to the airflow of the carrying aircraft.

Still another object of the invention is to provide a tube, rail or other similar type device for imposing directional restraint on the missile until it reaches a positive relative velocity so that the conventional stabilizing and control surfaces of the moving missile will provide proper control during the initial portion of its flight toward the target.

A further object of the invention is to provide means whereby any simple control system which can be used for guiding forwardly fired missiles is capable of controlling the directional movement of a rearwardly fired missile.

These and other objects, features and advantages, such as locating the munitions supply at or near the center of gravity of the carrying aircraft and the utilizing of standard type forward firing munitions in a dual capacity to simplify logistic problems, will become more apparent from the following description taken in connection with the illustrative embodiments depicted in the accompanying drawings wherein:

FIGURE 1 is a pictorial view of an aircraft equipped according to the invention;

FIGURE 2 is an enlarged view of the missile in position ready for rearward launching;

FIGURE 3 is a detailed view of a rail arrangement for guiding the missile along the aircraft fuselage;

FIGURE 4 is another embodiment of a rail or track which may be used for the initial guidance of the missile, and FIGURE 5 is still another embodiment of the invention for carrying the missile during its initial movement while overcoming the negative relative velocity.

Referring now to FIGURE 1, there is shown a general overall view of a high performance aircraft 13 of the B-52 type. A Falcon missile 15 with an auxiliary booster 16 (FIGURE 2) is in position on the upper portion of the fuselage 17 near the center of gravity of the aircraft. A rail 19 is also attached to the upper surface of the fuselage 17 and runs in a generally axial direction along the length of the aircraft. The missile 15 is adapted to ride along the rail 19 in a rearward direction toward the tail assembly of the carrying aircraft 13. As shown, the rail 19 guides the missile 15 along a path through the area between the normally positioned elevator 21 and the stabilizer 23 from where the missile leaves the carrying aircraft 13 and free flight commences.

A more detailed view of the missile 15 is shown in FIGURE 2. It will be noted that the missile 15 is provided with a booster rocket 16. Also, details of the opening 25 in the upper fuselage are shown, including the hinged cover doors 27.

Enlarged views of the various rail system embodiments are shown in detail in FIGURES 3, 4 and 5. These systems serve to guide and restrain the missile during the initial period of its accelerating cycle. In FIGURE 3 a dovetail type sliding arrangement is shown wherein the tenon portion 29 is fixedly attached to the aircraft fuselage 17. The mortise portion 31 is attached to the rocket booster 16 of the missile 15 and slidably mates with the tenon portion 29.

In order to provide a simple, yet effective, frictional initial direction guidance for a missile, such as the missile 15 and its booster 16, there is shown in FIGURE 4 a guide tube assembly 32 having an upper portion 33 to accommodate the body of the missile 15 while the lower portion 35, closer to the fuselage 17, is of a smaller dimension allowing the booster portion 16 of the missile to pass therethrough. It will be appreciated that, if desired, to save material, cost, and weight, the upper portion 33 may be eliminated from the tube assembly 32. The remaining lower portion 35 will adequately serve as a directional guide for the missile 15 by its surrounding relation to the booster portion 16. In any event, the lower portion 35 will have a longitudinal slot 36 cut through its upper surface to open through opposite ends of the lower portion allowing the passage of the members 38 (FIGURE 2), connecting the missile 15 and the booster portion 16, through the tube assembly. Where it is considered, for any reason, more desirable to use the entire tube assembly 32, rather than only the lower portion 35, the upper portion 33 is provided with a pair of radically outwardly extending missile fin passageways 37 and with a passageway disposed on an opposite side of the lower portion 33 to permit the side fins of the missile to pass through the tube assembly. Where the missile to be fired has fins of the pop-out type, it will be apparent that the fin passageways 37 will not be required and may be eliminated from the construction of the upper portion 33 of the tube assembly.

Another means for guiding the missile 15 along the aircraft fuselage is shown in FIGURE 5. A specially formed channel 41 is attached to the carrying aircraft 13. The channel 41 provides restricted area trackways 42 along its opposite longitudinal sides. A wheeled vehicle 43 is fixed to the underside of the rocket portion 16 of the missile 15. A series of wheels 45 are provided on the vehicle for engagement within the channel 41 and for movement along the trackways 42, and serve to reduce friction during the conveyance of the missile along the fuselage.

The operation of the rocket launcher is accomplished by raising the missile 15 which is stored near the center of the carrying aircraft 13 up to and through the opening 25 in the aircraft fuselage 17. A matching section of rail as, for example, 31 which is attached to the lower section of the rocket booster 16 is aligned with the main guide rail 19 so that the missile 15 can be guided along the fuselage 17 of the carrying aircraft 13 with restrained directional control. The missile with its booster rocket is normally ignited by remote triggering within the aircraft when the rail sections are aligned over the fuselage opening 25.

The missile 15 accelerates as it proceeds down the track in the rearward direction after ignition. By the time the missile reaches the end of the track 19 and leaves the carrying aircraft 13, it is traveling at a relative speed sufficient to overcome the negative effect of the forward movement of the aircraft. Thus, the relative velocity becomes positive and allows the conventional stabilizing surfaces, either fixed or controllable, to provide proper control of the flight of missile 15 even though it is traveling in a direction substantially opposite from the forward moving carrying aircraft. After the missile 15 leaves the carrying aircraft 13, the sled 31 or the wheeled vehicle 43 may be jettisoned from the free flying missile.

It is well known that the longer the missile travels in a certain directionally controlled path, the more likely that a true flight course is maintained. The invention herein described shows a lengthy control means for restraining the missile during its initial flight making its free flight toward the target more accurate. Also, the missile used as an example to show the operation of the invention is of the conventional boosted Falcon type. The primary purpose of the booster is to prevent the use of missile fuel to attain the positive relative velocity, and it should be understood that redesign of the missile by including a larger fuel supply and eliminating the booster section will require only simple corresponding redesign of the guidance means on the carrying aircraft.

Although only certain embodiments of our invention have been described herein, it will be apparent to those skilled in the art that various changes may be made in the construction and size of the elements without departing from the true spirit and scope of the appended claims. For example, the description of the invention is limited to a rearwardly oriented launcher because of the particularly troublesome problems involved in rearward launching techniques. However, the principles of the invention could be applied to forwardly launched missiles and means could be provided for launching a series of missiles from a single carrying aircraft, properly equipped missiles being stored inside the forward part of the aircraft.

Having thus described our invention, what we claim as new and desire to secure by Letters Patent of the United States is:

1. In combination with an aircraft, a rocket launching device for launching a missle in a direction opposite the direction of flight of the aircraft, said device comprising a rigid guide rail means rigidly attached along its length to the fuselage of the aircraft and extending longitudinally thereof to substantially the rear terminus, a carriage member mounting an air-launchable self-propelled missile, means on said carriage member adapted to engage said rail to restrain lateral movement while permitting longitudinal movement therebetween to control the direction of movement of the missile along said rail, said fuselage having an opening therein communicating with said rail, means disposed in said opening adapted to convey said missile to said rail, the linear dimension of said guide rail and the thrust of said missile being so selected that upon firing, said missile reaches a positive velocity in said first named direction with respect to the aircraft airstream before leaving said rail.

2. The combination of claim 1 wherein a booster is interposed between said air-launchable self propelled missile and said carriage.

3. In combination with an aircraft, a rocket launching device for launching a missile in a direction opposite the direction of flight of the aircraft, said device comprising a rigid guide rail means rigidly attached along its length to the fuselage of the aircraft and extending longitudinally thereof to substantially the rear terminus, a booster rocket mounting an air-launchable self-propelled missile, said booster rocket engaging said rail to restrain lateral movement while permitting longitudinal movement therebetween to thereby control the direction of movement of the missile along said rail, said fuselage having an opening therein communicating with said rail, means disposed in said opening adapted to convey missiles to said rail, the linear dimension of said guide rail and the thrust of said booster rocket being so selected that upon the firing of said booster, it and the missile reach a positive velocity in said first named direction with respect to the aircraft airstream before leaving said rail.

References Cited in the file of this patent

UNITED STATES PATENTS

| | | |
|---|---|---|
| 2,350,140 | Wilton | May 30, 1944 |
| 2,440,723 | MacDonald | May 4, 1948 |
| 2,470,120 | Walker | May 17, 1949 |
| 2,485,601 | Hickman | Oct. 25, 1949 |
| 2,606,725 | Dreibelbis | Aug. 12, 1952 |
| 2,734,702 | Northrop et al. | Feb. 14, 1956 |
| 2,932,238 | Musgrave | Apr. 12, 1960 |
| 2,938,430 | Pion | May 31, 1960 |
| 2,953,065 | Brown | Sept. 20, 1960 |

FOREIGN PATENTS

| | | |
|---|---|---|
| 89,970 | Sweden | Aug. 10, 1937 |